Oct. 30, 1962     G. A. SEELEY     3,061,661
BATTERY TERMINAL ASSEMBLY
Filed March 31, 1960
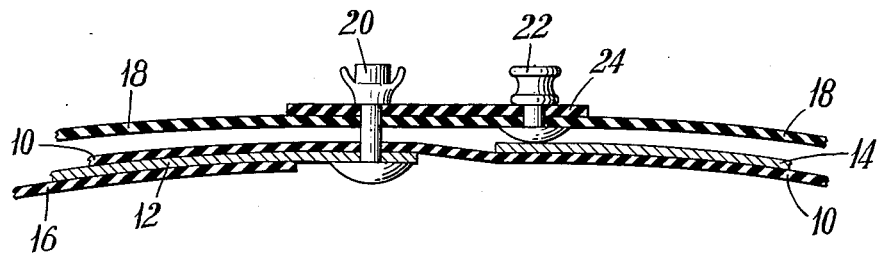
Fig. 1.
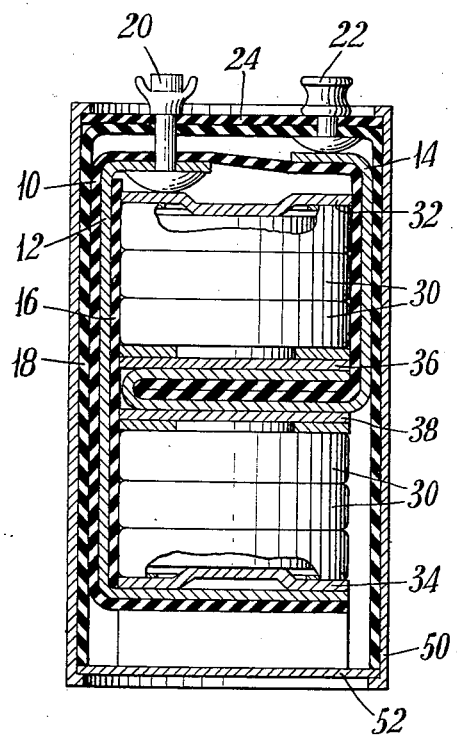 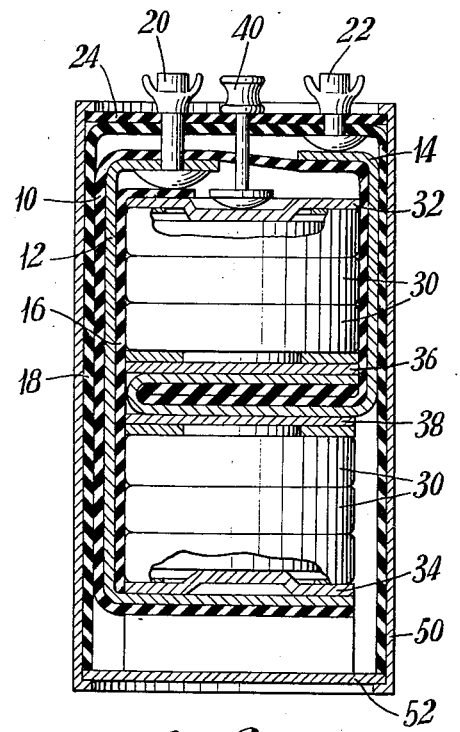
Fig. 2.     Fig. 3.
INVENTOR.
GERALD A. SEELEY
BY
ATTORNEY

United States Patent Office 3,061,661
Patented Oct. 30, 1962

3,061,661
BATTERY TERMINAL ASSEMBLY
Gerald A. Seeley, Charlotte, N.C., assignor to Union Carbide Corporation, a corporation of New York
Filed Mar. 31, 1960, Ser. No. 19,004
5 Claims. (Cl. 136—135)

This invention refers to terminals for galvanic batteries. It more particularly relates to an electrical jumper which is useful as part of such terminal.

In recent years many of the relatively high powered packages of electricity being marketed have been multiple cell batteries. That is, more than one individual galvanic cell has been appropriately connected and suitably packaged to give the desired power output. In this respect round cells, flat cells, cylindrical cells and a variety of other shape cells have been used advantageously.

It is an important object of this invention to provide an electrical jumper adapted to appropriately connect a plurality of individual galvanic cells into a battery.

It is another object of this invention to utilize this jumper in a battery of unusual configuration.

Fulfilling these objects, this invention includes an electrical jumper which comprises an insulating ribbon having strips of conductive material mounted on each side thereof with no portion of either strip overlying the other. One of the conductive strips has an additional insulator adhered to a portion of the exposed surface thereof. Another insulating ribbon is placed along the length of the first insulating material on the side thereof having the uninsulated conductive strip thereon. It is not necessary that this latter insulating material be adhered to the remainder of the assembly. It must, however, be fixed in relation thereto. This may be accomplished by riveting this insulating ribbon to the first insulating ribbon. This rivet should also be in contact with one of the conductive strips in order to act as a terminal therefor. A second rivet is preferably placed through the latter insulator into contact with the second conductive strip to act as a terminal for this strip. Both terminals are insulated from each other.

Understanding of this invention will be facilitated by reference to the accompanying drawing in which:

FIG. 1 is an elevation in section of an electrical jumper according to this invention;

FIG. 2 is a front elevation in section of a multiple cell battery utilizing the invented jumper; and FIG. 3 is similar to FIG. 2 showing a different arrangement of individual cells and the appropriate connections therefor.

Because of the particular construction of the electrical jumper described above, several unusual battery configurations having great utility are available. It is possible to form a battery having a single stack of flat cells wherein cells in portions of the stack are in series with each other and yet these portions as units are in parallel. It is also possible to utilize this electrical jumper to facilitate the formation of a single stack of individual galvanic cells which has a multiplicity of possible output powers. This latter type of battery may be equipped with more than two terminals so as to permit the user to select the proper voltage and amperage.

Reference will now be made to FIG. 1 of the accompanying drawings which shows an electrical jumper according to this invention. There is a ribbon of insulation 10 which has two strips 12 and 14 of electrically conductive foil laminated thereto. One of the strips 12 has a second insulating ribbon 16 adhered to a portion of its exposed surface and a third insulating ribbon 18 is fixed to the first ribbon 10 on the side thereof adjacent a foil strip 14. A rivet 20 fixes the third insulating ribbon 18 to the first insulating ribbon 10 and also serves as a contact terminal for the first foil strip 12. A second rivet 22 holds the third insulating ribbon 18 from rotating around the first rivet 20 and also serves as a contact terminal for the second foil strip 14. It is preferred that all the conductive strips and insulating ribbons be flexible so as to be adapted to connect a variety of different battery configurations. This is not necessary, however. If the jumper shape can be predetermined, all of these may be made rigid in a predetermined shape. In the case of flexible strips, it is desirable to have a non-conductive, rigid terminal spacer 24 which serves to keep the terminal rivets 20 and 22 in the proper relation and also forms the top cover for a battery of a stack of individual galvanic cells.

Referring now to FIG. 2, the electrical jumper of FIG. 1 is there shown in position within a battery of individual galvanic cells. The cells 30 are stacked in a single column with contact plates 32 and 34 at each end, and contact plates 36 and 38 at a point along the column height. In this battery, the second conductive foil 14 contacts both contact plates 36 and 38 along the height of the stack and the first conductive foil 12 contacts both contact plates 32 and 34 on each end of the stack. This configuration provides a parallel connected battery in a single vertical stack of cells. Thus in this illustration, the individual cells in the upper and lower stacks respectively are connected in series but the stacks themselves are connected in parallel. This construction is advantageous because it provides a high ampere output from a long relatively thin structure which may suitably be curved to fit the contour of a particular compartment. Thus, it may, for instance, be arcuate or even circular and still use the jumper disclosed herein.

FIG. 3 shows a battery of individual galvanic cells adapted to deliver a varied output depending upon the requirements of the user. This construction also uses the jumper shown in FIG. 1 with the small modification that the second insulating ribbon 16 is long enough to insulate the first rivet terminal 20 from the upper end of the stack of wafer cells 30. The first conductive foil 12 therefor contacts only the base contact plate 34 of the stack of cells. The second conductive foil 14 contacts contact plates 36 and 38 at some predetermined point along the length of the stack, preferably contacting both the cells above and below the contact point. A third rivet terminal 40 is provided through the spacer 24 in contact with the contact plate 32 at the upper end of the stack of cells. If there are a different number of cells above and below the contact point of the second conductive foil, there are at least four different outputs available from the battery. Thus, a load could be placed across terminals 20 and 22, 22 and 40, 20 and 40 or in parallel across 20 and 22 connected to 40. In each of the shown constructions, the battery casing is shown as 50 and the battery base plate is shown as 52.

These advantageous constructions are available regardless of the particular type of individual cell used to make up the battery. Thus, flat cells or wafer cells of substantially any plan configuration can conveniently be used.

The insulating ribbons of the electrical jumper may conveniently be made of any dielectric such as polyethylene, paper, cloth, vinyl resins, asbestos or a multitude of other similar materials. The conductive strips may be metal foil or plastic film loaded with conductive carbon or metal particles. The terminal spacer pad is preferably rigid and may be cardboard, heavy paper, reinforced plastic or the like. The rivet terminals may suitably be brass or any other convenient conductive rivet material. The external battery casing may be any suitable material such as cardboard, heavy paper, metal or reinforced plastic. These materials and others which work well are known to the battery art.

This invention is not limited to multiple cell galvanic batteries but is adapted to use with other electronic components such as capacitors for example.

What is claimed is:

1. An electrical jumper comprising a first insulating ribbon; two conductive strips insulated from each other by said first insulating ribbon and each respectively adhered to alternate sides of said first insulating ribbon and extending less than the entire length thereof; a second insulating ribbon adhered to a portion of the exposed side of the first of said conductive strips; a third insulating ribbon coextensive with said first insulating ribbon and adjacent to that side thereof having the second of said conductive strips laminated thereto; and at least two conductive rivets, each respectively in contact with only one of said conductive strips and insulated from each other, said rivet in contact with the first of said conductive strips also serving to hold said first and said third insulating ribbons adjacent each other.

2. An electrical jumper as described in claim 1 which is flexible and wherein said second insulating ribbon extends over that portion of said first rivet adjacent said first conductive strip.

3. An electrical jumper as described in claim 2 wherein a third conductive rivet is placed through said first insulating ribbon, siad rivet being insulated from said conductive strips and from said other rivets.

4. A battery of individual galvanic cells comprising a stack of such cells and an electrical jumper as described in claim 1 wherein said first conductive strip contacts the end cells of said stack and wherein said second conductive strip contacts the center of said stack.

5. A battery of individual galvanic cells comprising a stack of such cells and an electrical jumper as described in claim 3 wherein said first conductive strip contacts one end cell of said stack, said second conductive strip makes contact with said stack at a point intermediate the ends thereof, and said third conductive rivet contacts the other end cell of said stack.

References Cited in the file of this patent

UNITED STATES PATENTS

| | | |
|---|---|---|
| 953,640 | Patterson | Mar. 29, 1910 |
| 1,487,429 | Balderston | Mar. 18, 1924 |
| 1,544,772 | Osean | July 7, 1925 |
| 1,641,685 | Meisekothen | Sept. 6, 1927 |
| 2,464,022 | Carpenter | Mar. 8, 1949 |
| 2,671,820 | Herbert | Mar. 9, 1954 |